(12) United States Patent
Piotrowski et al.

(10) Patent No.: US 7,168,722 B1
(45) Date of Patent: Jan. 30, 2007

(54) PULL-OUT STEP ASSEMBLY FOR A PICKUP TRUCK

(76) Inventors: Leo D. Piotrowski, N 2795 Stein La., Pepin, WI (US) 54759; Jesse J. Wilson, N 2706 County Rd. J, Stockholm, WI (US) 54769

( * ) Notice: Subject to any disclaimer, the term of this patent is extended or adjusted under 35 U.S.C. 154(b) by 173 days.

(21) Appl. No.: 10/923,643

(22) Filed: Aug. 23, 2004

(51) Int. Cl.
*B60R 3/02* (2006.01)

(52) U.S. Cl. .................................................. 280/166

(58) Field of Classification Search ............... 280/166, 280/163, 164.1; 182/127; 296/62; 105/444, 105/445, 446, 447
See application file for complete search history.

(56) References Cited

U.S. PATENT DOCUMENTS

| | | | | |
|---|---|---|---|---|
| 2,544,799 | A * | 3/1951 | Witt ............................ | 182/88 |
| 2,779,525 | A * | 1/1957 | Vogel ......................... | 182/88 |
| 3,515,406 | A * | 6/1970 | Endsley, Jr. ................. | 280/166 |
| 3,756,622 | A * | 9/1973 | Pyle et al. ................... | 280/166 |
| 3,796,456 | A * | 3/1974 | Bergeson et al. ........... | 296/156 |
| 3,853,369 | A | 12/1974 | Holden | |
| 3,889,997 | A | 6/1975 | Schoneck | |
| 3,961,809 | A | 6/1976 | Clugston | |
| 4,848,821 | A * | 7/1989 | Llewellyn .................... | 296/62 |
| 5,205,603 | A | 4/1993 | Burdette, Jr. | |
| 5,228,707 | A * | 7/1993 | Yoder .......................... | 280/166 |
| 5,803,475 | A | 9/1998 | Dick | |
| 5,897,125 | A | 4/1999 | Bundy | |
| 6,170,843 | B1 | 1/2001 | Maxwell et al. | |
| 6,237,927 | B1 | 5/2001 | Debo | |
| 6,270,139 | B1 | 8/2001 | Simpson | |
| 6,357,773 | B1 * | 3/2002 | Griebel et al. .............. | 280/166 |
| 6,422,342 | B1 | 7/2002 | Armstrong et al. | |
| 6,474,668 | B2 | 11/2002 | Debo | |
| 6,530,588 | B1 | 3/2003 | Varney et al. | |
| 6,682,086 | B1 | 1/2004 | Erickson | |
| 6,880,843 | B1 * | 4/2005 | Greer, Jr. .................... | 280/166 |
| 6,905,158 | B1 * | 6/2005 | Bastian ....................... | 296/62 |
| 2002/0070577 | A1 | 6/2002 | Pool, III et al. | |

* cited by examiner

*Primary Examiner*—Frank Vanaman
(74) *Attorney, Agent, or Firm*—Tipton L. Randall (57) ABSTRACT

A pull-out step assembly for a cargo box vehicle is disclosed. The assembly provides one or two steps to access the cargo box of a pickup truck or similar vehicle. The pull-out step assembly can be deployed with the tail gate of the cargo box in a closed or open condition. The pull-out step assembly attaches to the vehicle frame and stores beneath the cargo box when not in use. Also disclosed is a protective box member that covers the step assembly when stored beneath the cargo box.

11 Claims, 8 Drawing Sheets

PULL-OUT STEP ASSEMBLY FOR A PICKUP TRUCK

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a pull-out step assembly mounted to the frame of a pickup truck or similar vehicle and, more particularly, to a pull-out step assembly mounted to the rear of the vehicle and beneath the bed of a pickup truck or similar vehicle.

2. Background Information

Pickup trucks and similar vehicles with a cargo box mounted to the vehicle frame present an obstacle to entry by an individual due to the height of the cargo box above the surface upon which the truck rests. The use of oversized tires on such pickup trucks elevates the cargo box even higher above the support surface, further magnifying the obstacle. Pickup trucks almost universally contain a tailgate at the rear of the cargo box that is hinged to the bed of the cargo box across the rear thereof. The tailgate normally contains a mechanism allowing the tailgate to open to a coplanar condition with the floor or bed of the cargo box. Although the open tailgate provides a low point for entry into the cargo box compared to the upright sides of the cargo box, any step or ladder mechanism must extend beyond the end of the tailgate for access by an individual entering the cargo box via the tailgate.

Some examples of inventions for which patents have been granted are concerned with various steps or stairs providing access to the cargo box of a pickup truck or similar vehicle.

Holden, in U.S. Pat. No. 3,853,369, describes folding steps connected to the tailgate of a vehicle such that the steps are moved from a horizontal operative position when the tailgate is lowered and are moved to a substantially vertical storage position when the tailgate is raised. A lower step is secured to rigid angle members suspended from an intermediate step which is pivoted to the vehicle. The lower step is maintained in a horizontal position by adjustable braces connected through a linkage to permit folding to a collapsed position when the tailgate is raised.

U.S. Pat. No. 3,961,809 by Clugston discloses a tailgate-mounted safety step assembly for pickup trucks, which includes a linkage assembly coupled with a step for permitting shifting of the latter between a storage position and a lowered horizontal use position. In conjunction, a selectively engageable clutch lock operates to securely lock the step in the use position when a person mounts the step. The structure allows the lowered step to shift fore-and-aft when not in use in order to accommodate any road obstructions which may be encountered. By virtue of the unique clutch lock employed, the step assembly may be utilized without fear of instability or unsteadiness, notwithstanding the fact that the lowered step is movable when struck by an obstruction in order to preclude damage to the overall assembly. In preferred forms, the assembly includes parallelogram linkage, having a split shaft clutch lock secured to the step and telescoped over a transverse, axially rotatable pivot member of the linkage assembly. When a person mounts the step, the clutch lock engages the pivot member to releasably hold the latter and thereby temporarily rigidify the entire step assembly to permit safe use thereof.

In U.S. Pat. No. 3,889,997, Shoneck discloses a truck end gate step unit that is attached by four brackets, two on the bumper or transverse frame member if no bumper is present, and two on the upper edge of the end gate. A universal mounting plate is provided upon each side of the step, with hanger straps extending up to the brackets on the tail gate and hanger straps extending back to the brackets on the bumper or frame member. The anchor straps are adjustable in length and in their attachment to the mounting plates. The hanger straps can be pivotally secured in any one of several apertures in the mounting plate above the securement of the anchor straps.

Burdette, Jr., in U.S. Pat. No. 5,205,603, describes a ladder assembly that is mounted slidably and telescopingly within a tailgate portion of a truck bed. The ladder assembly includes first and second ladder members extensibly mounted relative to the tailgate and, more specifically, to a cavity there within. The ladder assembly provides ease of access to the truck bed, with a handrail connected to the truck bed and tailgate for stability when using the ladder assembly.

U.S. Pat. No. 5,803,475 by Dick discloses a receiver hitch step attachment that mounts to the existing receiver hitch of a pickup truck and supports a set of steps that are adjustable laterally and vertically. An auxiliary stabilizer leg is provided for engaging the ground beneath the attachment when the truck is parked, in order to support the vehicle against rocking when weight is applied to the steps or when moving about in the camper.

In U.S. Pat. No. 5,897,125, Bundy describes a truck step securable to a vehicle via a mounting bracket and having a step arm capable of swiveling between a "storage" position underneath the vehicle and an "in use" position where the step arm extends outward from under the vehicle. One end of the step arm is provided with a step plate where a user's foot may be placed when stepping into the vehicle, and an opposite end of the step arm is provided with a lower swivel plate which swivels relative to an upper swivel plate provided on the mounting bracket. The lower and upper swivel plates have mating valleys and ridges to lock the step in one of several positions.

Maxwell et al., in U.S. Pat. No. 6,170,843, describe a step holding member having a first end, which is insertable into a receiver-type trailer hitch, and a second end, which is adapted for holding a step member for stepping onto the tailgate of a pickup truck. In another embodiment, the step holding member telescopes in and out toward a side of a pickup truck allowing for easy storage when telescoped in. In a third embodiment the step holding member folds inwards from the pickup toward the trailer hitch for storage. A fourth embodiment is adapted for mounting directly onto a trailer hitch draw bar so that the hitch may be used for towing with the step in place for use.

U.S. Pat. No. 6,237,927 by Debo discloses a pull out step which can be extended directly to the rear of a pickup truck making it possible to step from the ground to the tread of the step and then to the tailgate of the truck. A bracket attached to a trailer hitch on the truck slidably supports a beam which supports the tread and allows the beam to be locked in either the extended or retracted positions. For use with trucks having an unusually high chassis, the beam may include a gooseneck to lower the elevation of the tread to approximately one half the elevation of the tailgate.

Simpson, in U.S. Pat. No. 6,270,139, describes an extendable tailgate ladder assembly for providing improved accessibility for truck beds. The extendable tailgate ladder assembly includes a ladder, a pair of tracks, a pair of feet, a cover member, a plurality of first connection members and a plurality of second connection members. The ladder assembly stores vertically against the tailgate when not is use.

Armstrong et al., in U.S. Pat. No. 6,422,342, describe a stowable step having a housing, an U-shaped step platform and a sliding member pivotally engaging the step platform. The sliding member is slidably mounted within the housing for reciprocating movement between a retracted, stowed position where the platform extends into the housing and a deployed position where the platform can pivot relative to the sliding member to a substantially vertical position.

U.S. Pat. No. 6,474,668 by Debo discloses a pull out step which can be extended directly to the rear of a pickup truck, making it possible to step from the ground to the tread of the step and then to the tailgate of the truck. A bracket attached to a trailer hitch on the truck slidably supports a beam which supports the tread and allows the beam to be locked in either the extended or retracted positions. For use with trucks having an unusually high chassis, the beam may include a gooseneck to lower the elevation of the tread to approximately one half the elevation of the tailgate. The bracket may also be attached directly to the body of the truck.

In U.S. Pat. No. 6,530,588, Varney et al. describe a vehicle step apparatus for allowing a user easy access to pickup beds and sport utility vehicle cargo areas. The vehicle step apparatus includes a step support assembly that has a mounting assembly that is coupled to the vehicle. A support member is slidably coupled to the mounting assembly such that a distal end of the support member is slidably positioned with respect to the mounting assembly. A step support frame is coupled to the distal end of the support member such that the step support frame extends downwardly from the distal end of the support member. A step member is removably coupled to the step support frame opposite the support member. A step plate is coupled to a distal end of the step member, such that the step plate is designed for supporting the weight of a user stepping into the vehicle.

Erickson, in U.S. Pat. No. 6,682,086, describes a step platform assembly for attachment to a vehicle hitch assembly. The platform assembly includes a planar step platform member rigidly fastened to a coplanar linear step support member having an aperture adjacent a step support member end opposite the step platform member. The aperture contains a bushing member with the planar step platform member and step support member assembly adapted for rotatable connection to the hitch assembly by a fastener there between. A locking system is present for selectively securing the step platform member and linear step support member either beneath a vehicle body or exterior a vehicle body.

U.S. Patent Application No. 2002/0070577, by Pool, III et al., discloses a tailgate step apparatus that includes a tailgate with an inner edge and an outer edge. A first channel is affixed within the tailgate so as to extend between the inner and outer edges, and a second channel is affixed within the tailgate so as to extend between the inner and outer edges in a generally parallel spaced relationship to the first channel. A frame assembly is slidably received within the tailgate between the first and second channels so as to be movable between a first position within the tailgate to a second position extending outwardly of the tailgate. A step member is pivotally connected to the frame so as to have a surface positioned outwardly of the outer edge of the tailgate when the frame assembly is in the second position. The step member is movable so as to assume a horizontal orientation when the frame assembly is in the second position. The frame assembly is retractable along the first and second channels so as to be received interior of the tailgate.

Applicants have devised a pull-out step assembly that is secured to the frame of the vehicle, is usable with the cargo box tail gate closed or open, and is stored beneath the cargo box when not is use.

SUMMARY OF THE INVENTION

The invention is directed to a pull-out step assembly mounted to the frame of a pickup truck or similar vehicle. The step assembly is mounted to the rear of the vehicle and beneath the cargo box thereof. The step assembly includes a pair of U-shaped sections mounted in register. Each U-shaped section has a pair of parallel leg members and a transverse step member forming the bottom of each U-shaped section. The first U-shaped section has telescoping leg members with each leg member end, opposite the first step member, secured to the vehicle frame below the cargo box thereof. The telescoping leg members are mounted so that the first step member is beneath the cargo box with the leg members retracted. The telescoping leg members are of sufficient length to extend the first step member beyond the end of the vehicle tailgate with the tailgate in a down or horizontal position. The second U-shaped section's parallel leg members are sized to fit just outside the leg members of the first U-shaped section, with the second step member positioned on top of the leg members of the first U-shaped section. The second U-shaped section's leg members are pivotally attached to both the second step member and the first step member. With the telescoping leg members extended, the second step member can be pivoted by about 210 degrees around the first step member. Stop members are provided to support the leg members and second step member lower than the first step member. Thus, the second step member moves from atop the telescoping leg members of the first U-shaped section to a position with the second step member below the first step member, providing a pair of steps for a user climbing into the cargo box of the vehicle from ground level.

In a further embodiment of the invention, a box member is secured to the frame to protect the step assembly from damage or debris that could hinder function of the telescoping leg sections or the pivoting leg sections. The step assembly is secured interior the box member, and the box member has an opening facing the rear of the vehicle, allowing the telescoping leg members and step members to extend to the in-use or deployed position. Preferably, the box member is fabricated from plastic or similar material for durability, corrosion resistance and economy of manufacture.

DESCRIPTION OF THE EMBODIMENTS

Nomenclature
10 Pull-Out Step Assembly
20 First U-Shaped Section
22 Telescoping Leg Members
24 First End of Telescoping Leg Members
26 Second End of Telescoping Leg Members
28 Concentric Slide Sections
30 Transverse Top Step Member
32 Top Side of Top Step Member
34 Opposed Ends of Top Step Member
36 Pivot Pins of Top Step Member
38 Stops Secured to Top Step Member
40 Second U-Shaped Section
42 Rigid Leg Members
44 First End of Rigid Leg Members
46 Second End of Rigid Leg Members
50 Transverse Bottom Step Member
52 Top Side of Bottom Step Member
54 Opposed Ends of Bottom Step Member
56 Pivot Pins of Bottom Step Member
58 Stops Secured to Bottom Step Member
60 Bracket Members
70 Storage Box Member
72 Top of Box Member
74 Bottom of Box Member
76 Sides of Box Member
78 Open Side of Box Member
F Frame of Vehicle
B Bed of Cargo Box
T Tailgate of Cargo Box Construction The present invention is a pull-out step assembly mounted to the frame of a pickup truck or similar vehicle. The step assembly is mounted to the rear of the vehicle and beneath the cargo box thereof. The step assembly includes a first U-shaped section including a pair of linear telescoping leg members with each leg member secured at a first end to the vehicle frame. A transverse top step member, having a horizontal, planar top side and opposed ends, is rigidly secured to a second end of each telescoping leg member. A second U-shaped section includes a pair of linear rigid leg members. Each leg member is pivotally attached at a first end to the transverse top step member, and each leg member is pivotally attached at a second end to a transverse bottom step member. The bottom step member has a horizontal, planar top side and opposed ends. The second U-shaped section is pivotable from a storage position with the bottom step member resting atop the telescoping leg members to a deployed position with the bottom step member extending below the top step member with the planar top sides of the step members mutually parallel.

Figure 1:
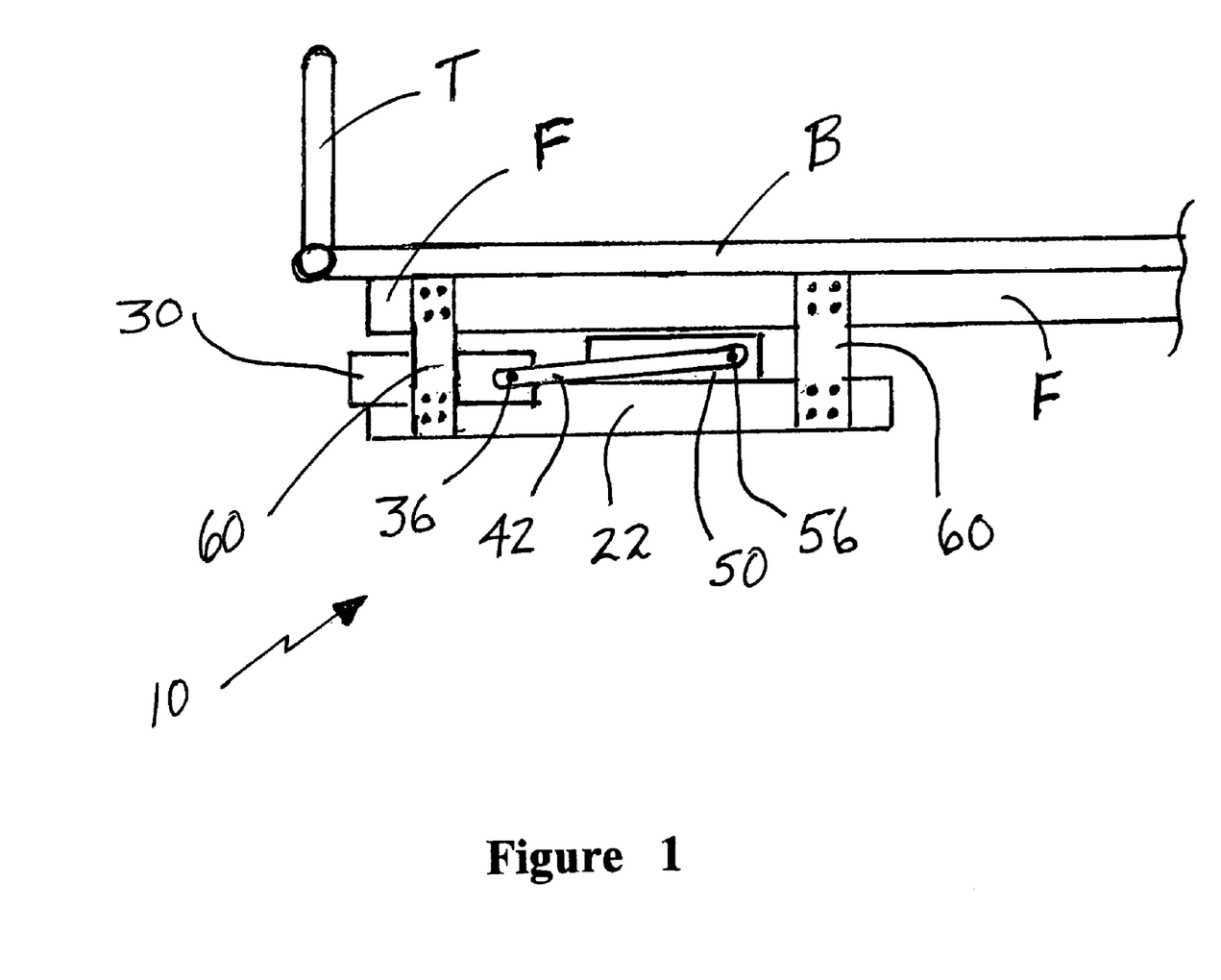
FIG. 1 is a side view of a first embodiment of the pull-out step assembly of the present invention in the storage position.
Figure 2:
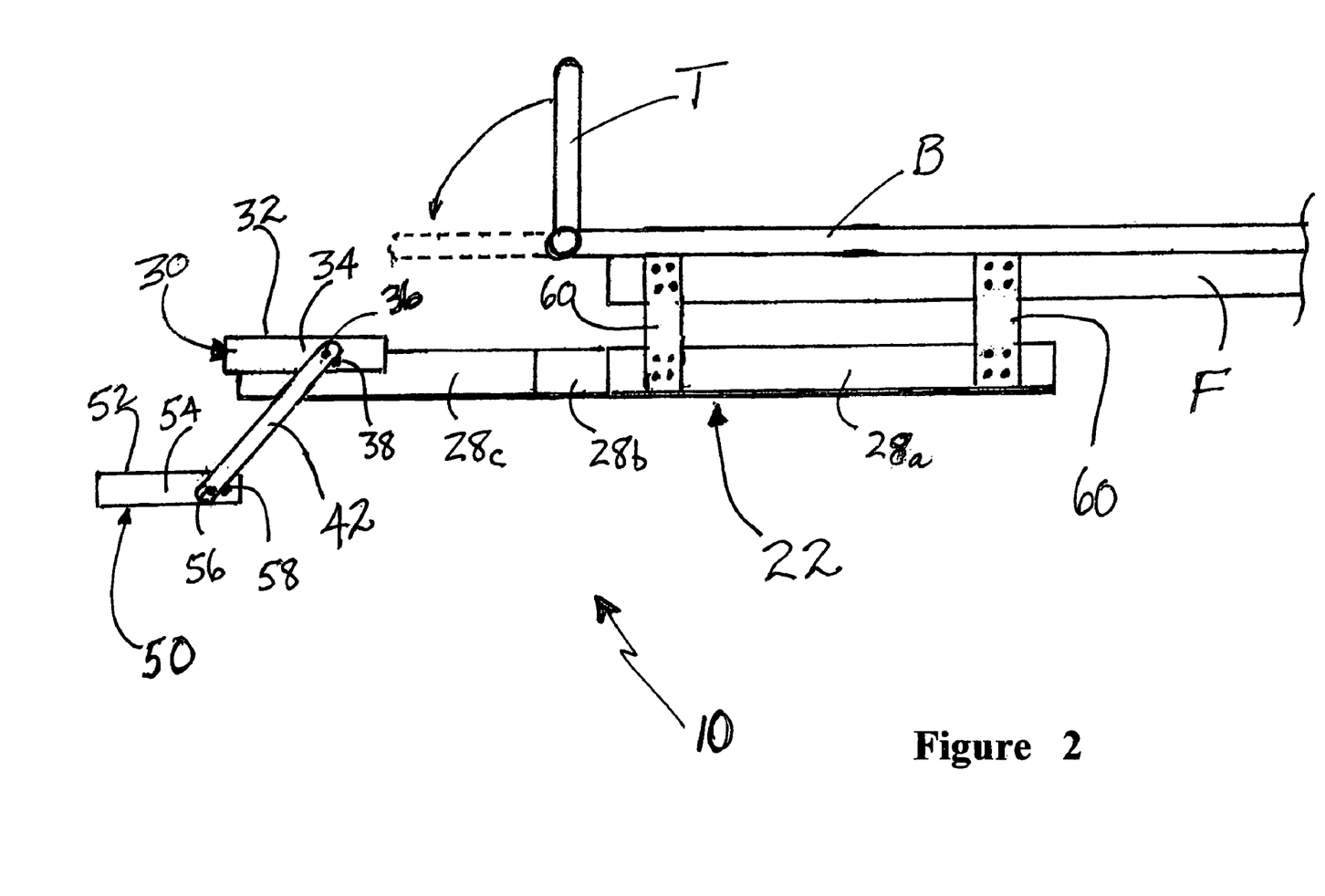
FIG. 2 is a side view of the first embodiment of the pull-out step assembly of the present invention in the deployed position.
Figure 3:
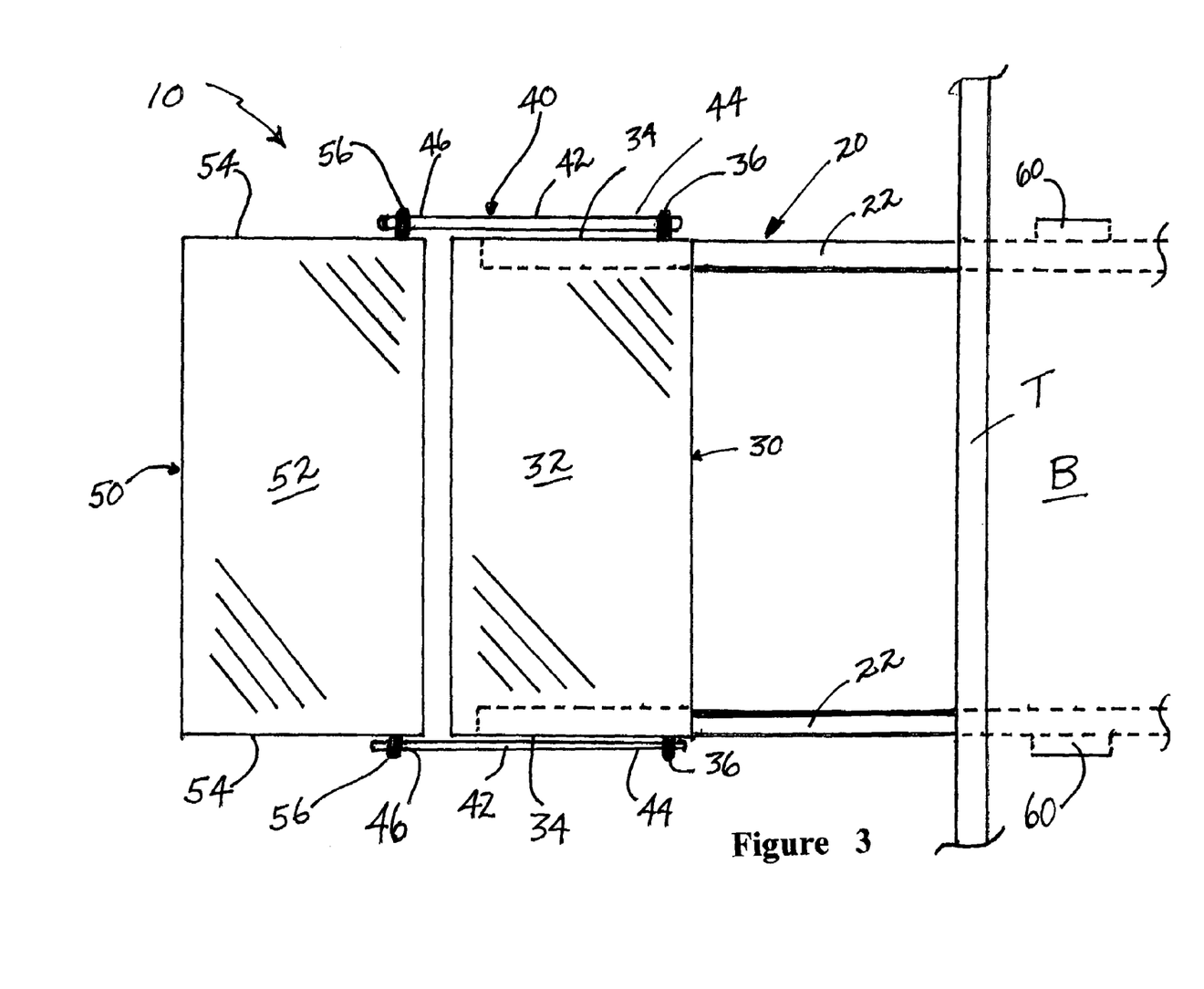
FIG. 3 is a top view of the first embodiment of the pull-out step assembly of the present invention in the deployed position.
Figure 4:
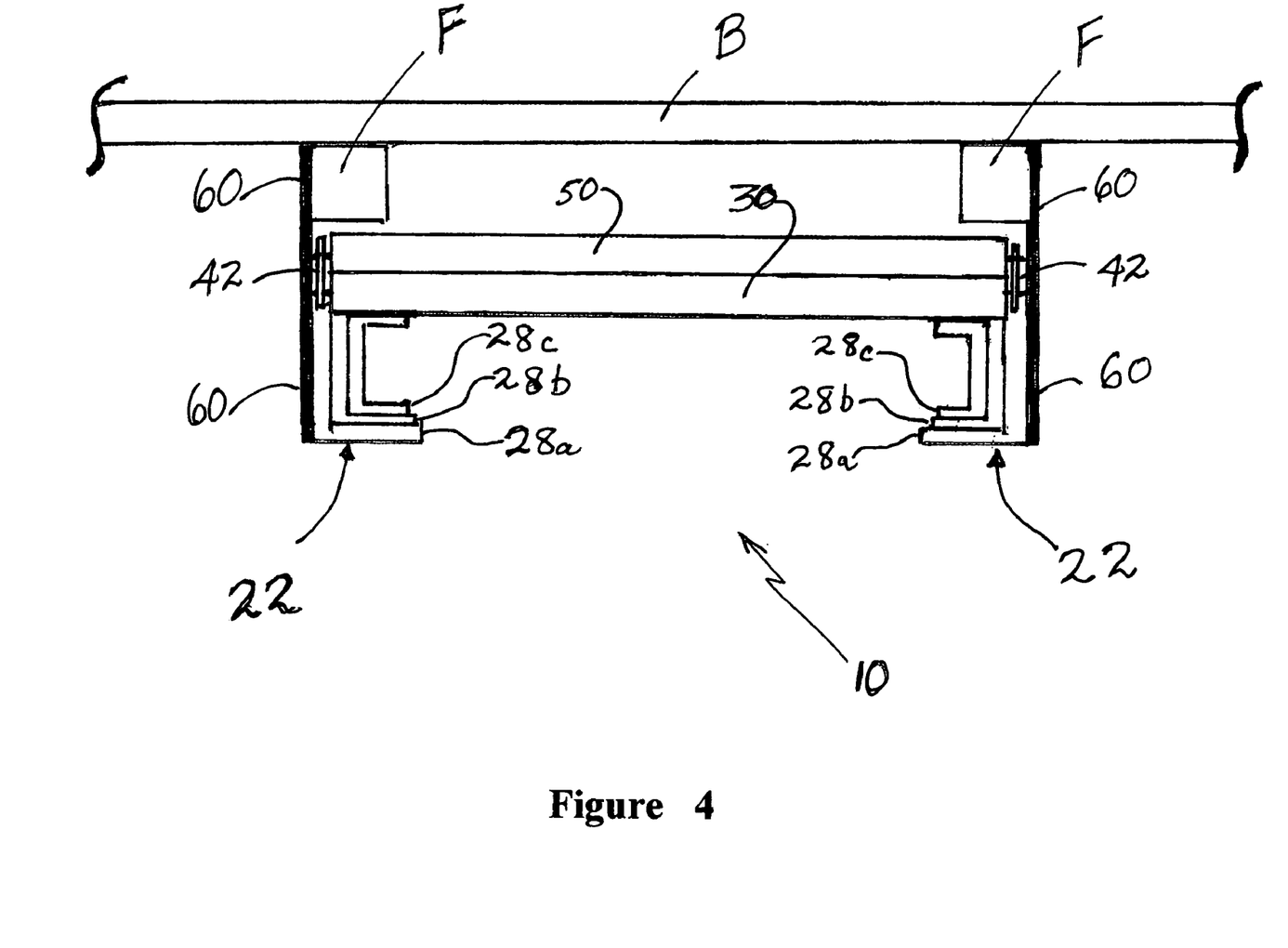
FIG. 4 is an end view of the first embodiment of the pull-out step assembly of the present invention in the storage position.

Referring now to FIGS. 1–4, a first embodiment of the pull-out step assembly 10 is shown. FIG. 1 shows a side view of the step assembly 10, and FIG. 4 shows a rear end view of the step assembly 10, both with the step assembly 10 in the storage position. FIG. 2 shows a side view of the step assembly 10, and FIG. 3 shows a top view of the step assembly 10, both with the step assembly 10 in the deployed position. In all of the Figures, the vehicle frame F supports a cargo box having a bed B and a tailgate T.

The step assembly 10 includes a first U-shaped section 20 including a pair of linear telescoping leg members 22, with each leg member 22 secured at a first end 24 to the vehicle frame F. In the embodiment shown in FIGS. 1–4, each telescoping leg member 22 is secured to the frame F by a pair of brackets 60. Each bracket 60 may be welded, bolted or otherwise secured to both the frame F and to one telescoping leg member 22. A transverse top step member 30, having a horizontal, planar top side 32 and opposed ends 34, is rigidly secured to a second end 26 of each telescoping leg member 22, thereby forming the first U-shaped section 20.

Figure 7:
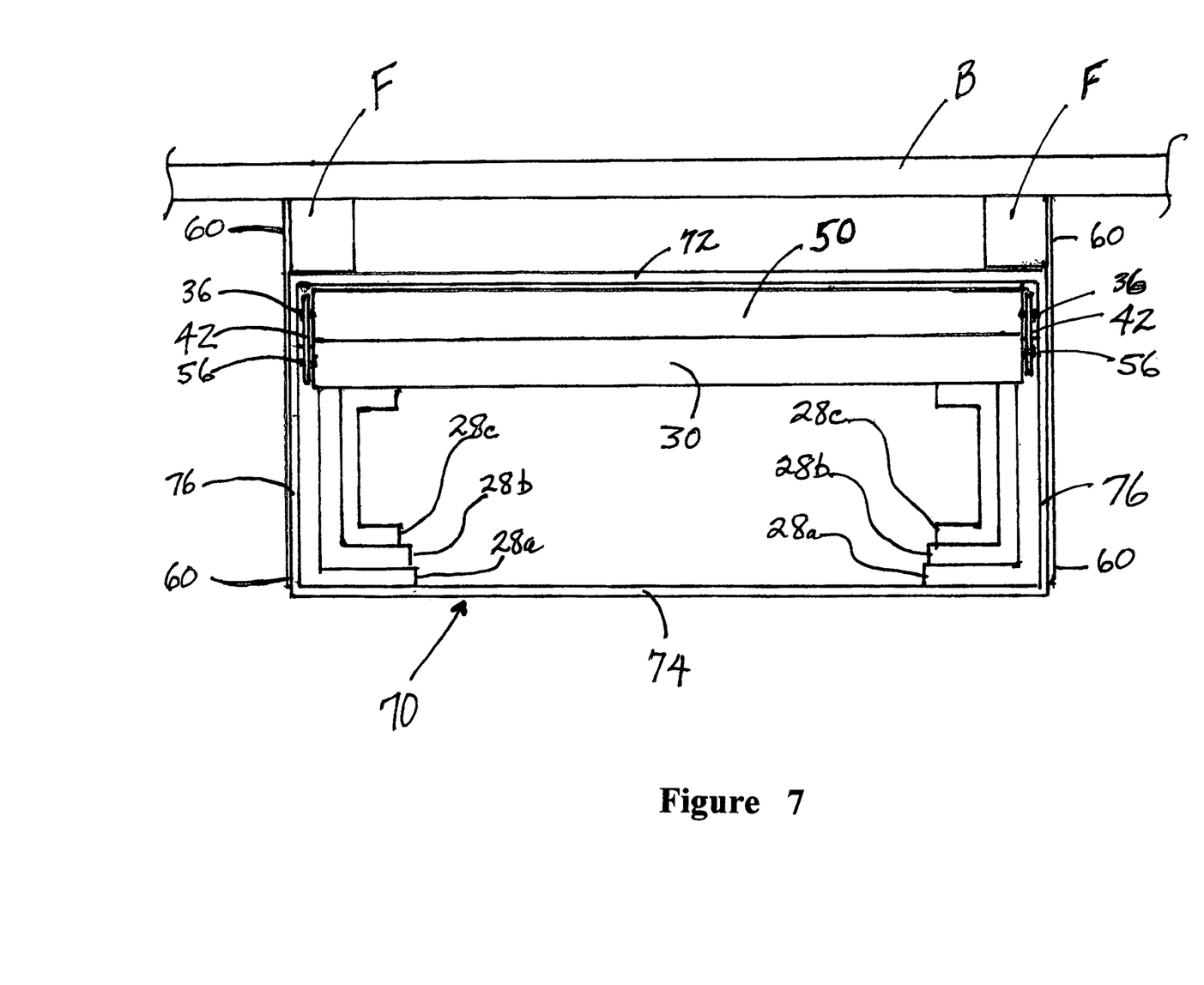
FIG. 7 is an end view of the second embodiment of the pull-out step assembly of the present invention in the storage position.

Preferably, each telescoping leg member 22 is composed of concentric slide sections 28a, 28b 28c, best seen in FIGS. 4 and 7. The concentric slide sections 28a, 28b, 28c each have a U-shaped cross section and provide the telescoping feature by sliding displacement relative to each other. Other telescoping structures for the leg members 22 are contemplated with equivalent results. For example, the telescoping leg members 22 may be comprised of two or more concentric tubular members with suitable features to allow telescoping of the nested tubular members. The tubular members may have a round or square cross section, although other shapes for the cross section are contemplated with equivalent results.

A second U-shaped section 40 includes a pair of linear rigid leg members 42. Each leg member 42 is pivotally attached at a first end 44 to the transverse top step member 30, and each leg member 42 is pivotally attached at a second end 46 to a transverse bottom step member 50. The bottom step member 50 has a horizontal, planar top side 52 and opposed ends 54. Preferably, each rigid leg member 42 is pivotally attached at a first end 44 to the top step member 30 by means of a pivot pin 36 protruding from an opposed end 34 of the top step member 30. Also preferably, each rigid leg member 42 is pivotally attached at a second end 46 to the bottom step member 50 by means of a pivot pin 56 protruding from an opposed end 54 of the bottom step member 50. The first and second U-shaped sections 20, 40 are best seen in FIG. 3, with the step assembly 10 in the deployed position.

The second U-shaped section 40 is pivotable from a storage position with the bottom step member 50 resting atop the telescoping leg members 22 (FIGS. 1 and 4), to a deployed position with the bottom step member 50 extending below and parallel to the top step member 30 (FIGS. 2 and 3). In moving from the stored position to the deployed position, the first U-shaped section 40 telescopes from beneath the vehicle frame F a sufficient distance to position the top step member 30 beyond the tailgate T in a horizontal or open condition, as illustrated in FIG. 2. The second U-shaped section 40 is sized to clear the cargo box bed B when the bottom step member 50 and attached rigid arms 42 rotate through about 210 degrees, with the first U-shaped section 20 fully extended. The bottom step member 50 moves from a storage position atop the telescoping leg members 22 (FIGS. 1 and 4) to a deployed position with the bottom step member 50 extending below and parallel to the top step member 30 (FIGS. 2 and 3).

Figure 8:
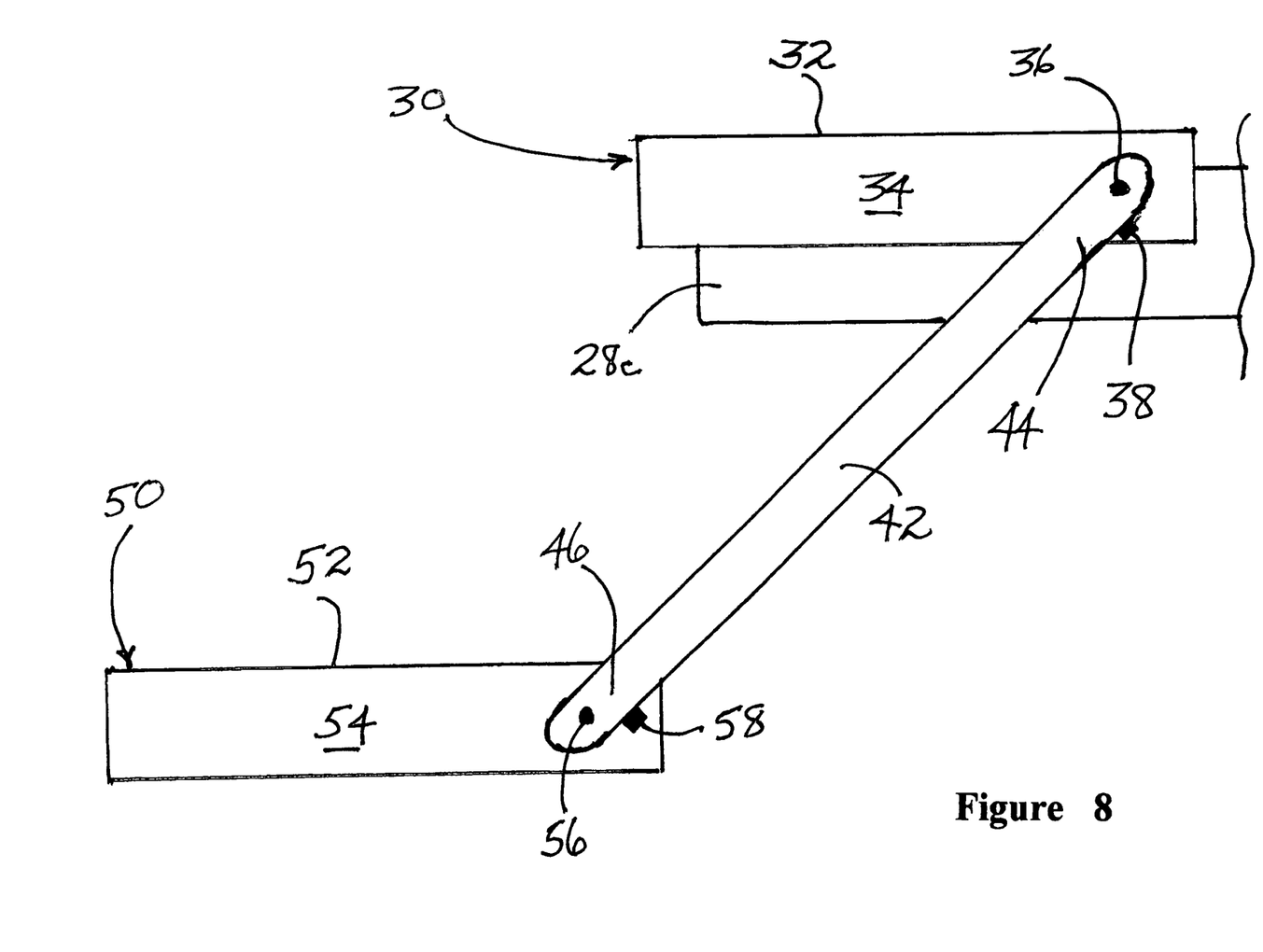
FIG. 8 is a side view of the top and bottom step members of the pull-out step assembly of the present invention in the deployed position.

In order to limit the rotation of the rigid arm members 42 relative to the top step member 30, a stop member 38 is secured to each opposed end 34 of the top step member 30, adjacent the pivot pin 36. The stop member 38 is best seen in FIG. 8. Likewise, in order to limit the rotation of the rigid arm members 42 relative to the bottom step member 50, a stop member 58 is secured to each opposed end 54 of the bottom step member 50, adjacent the pivot pin 56. The stop member 58 is best seen in FIG. 8. The stop member 38 may be a bolt, a pin, or any rigid body to limit the rotation of the rigid arm member 42 about the pivot pin 36, and provides about a 30 to 45 degree angle between the horizontal, planar top side 32 of the top step member 30 and the rigid arm member 42. Likewise, a stop member 58 is secured to each opposed end 54 of the bottom step member 50, adjacent the pivot pin 56, to limit the rotation of the rigid arm members 42 relative to the bottom step member 50. The stop member 58 may be a bolt, a pin, or any rigid body to limit the rotation of the rigid arm member 42 about the pivot pin 56, and provides about a 120 to 135 degree angle between the horizontal, planar top side 52 of the bottom step member 50 and the rigid arm member 42.

Figure 5:
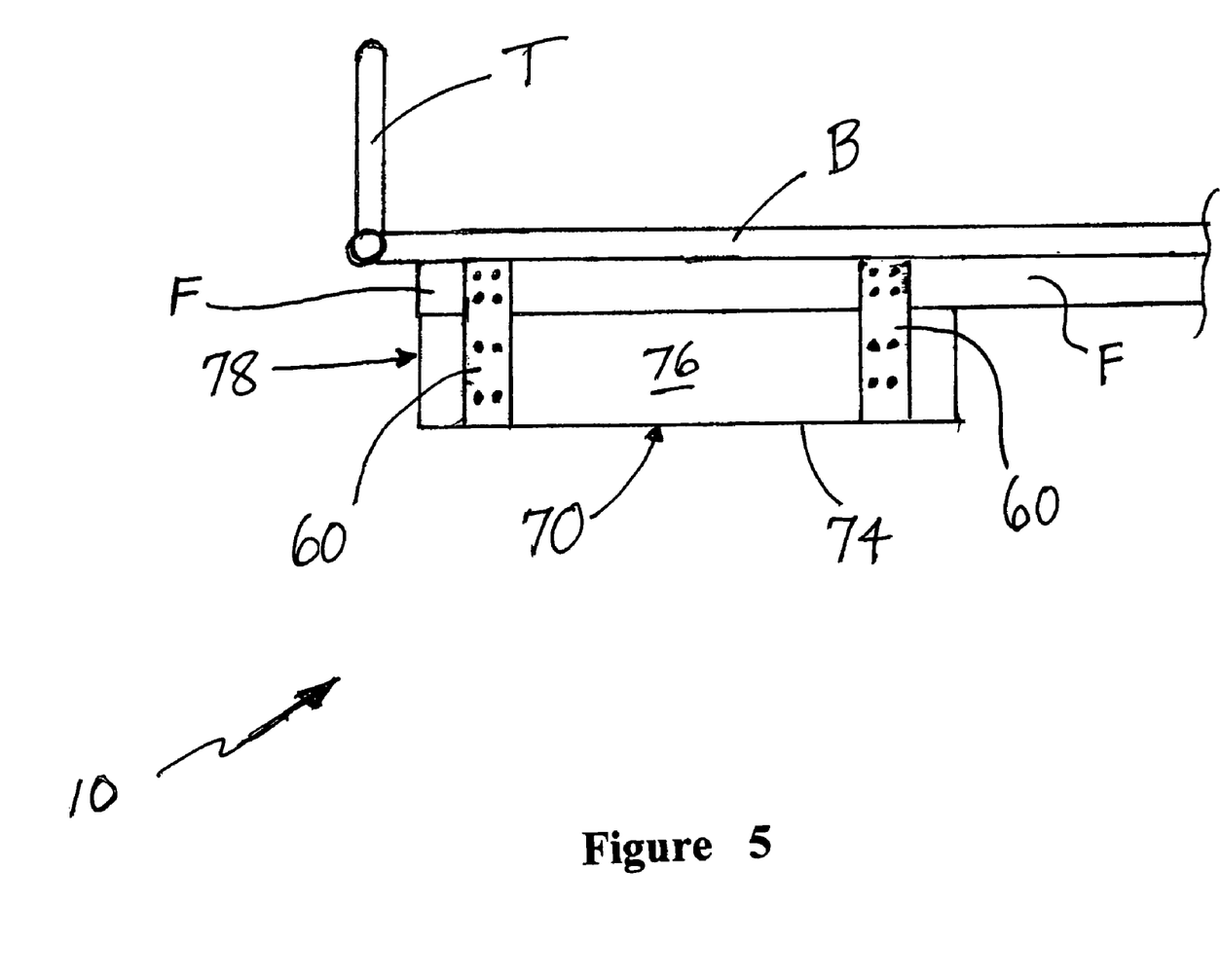
FIG. 5 is a side view of a second embodiment of the pull-out step assembly of the present invention in the storage position.
Figure 6:
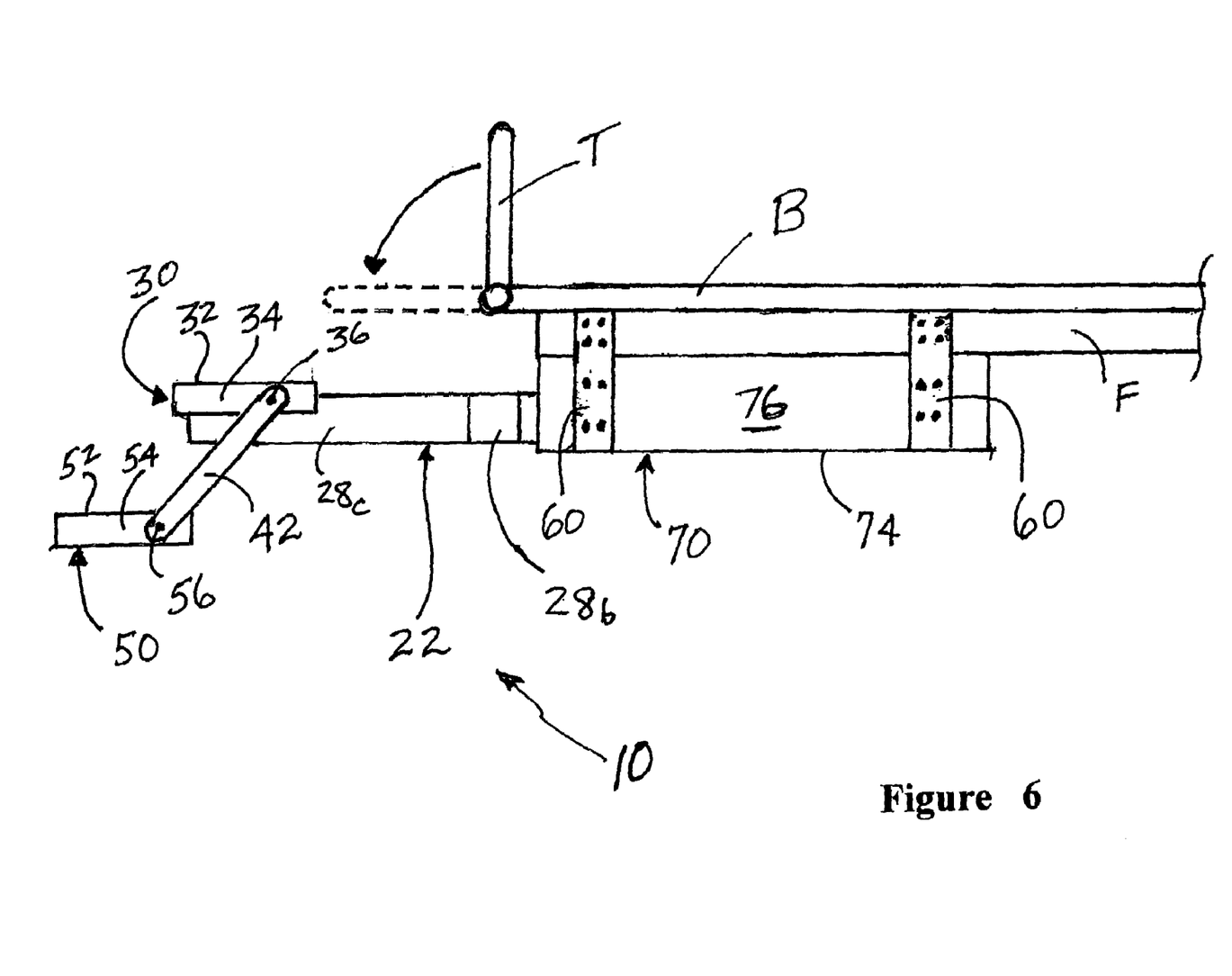
FIG. 6 is a side view of the second embodiment of the pull-out step assembly of the present invention in the deployed position.

Referring now to FIGS. 5–7, another embodiment of the pull-out step assembly 10 is shown. In this embodiment, a storage box member 70 is provided with the pull-out step assembly 10 secured therein. The storage box member 70 has an open side facing the rear of the cargo box allowing the step assembly 10 to be deployed from within the box member 70. The box member 70 protects the step assembly 10 from road grit and similar debris that might interfere with the operation of the telescoping leg members 22 and/or the pivoting rigid leg members 42.

FIGS. 5 and 6 show the step assembly 10 in the storage position and in the deployed position, respectively. FIG. 7 is an end view of the step assembly 10 in the storage position, secured within the storage box member 70.

The storage box member 70 includes a top 72, a bottom 74 and three sides 76, as well as an open side 78 facing the rear of the cargo box, adjacent the tailgate T. The box member 70 is secured to the vehicle frame F beneath the cargo box by pairs of brackets 60 attached to opposed vertical sides 76 of the box member 70. Each bracket 60 may be welded, bolted or otherwise secured to both the frame F and to one side 76 of the box member 70, as illustrated in FIGS. 5–7.

The step assembly 10 moves from the stored position to the deployed position as described above. The first U-shaped section 40 telescopes horizontally from within the storage box member 70 beneath the vehicle frame F a sufficient distance to position the top step member 30 beyond the tailgate T in a horizontal or open condition, as illustrated in FIG. 6. The second U-shaped section 40 is sized to clear the cargo box bed B when the bottom step member 50 and attached rigid arms 42 rotate through about 210 degrees, with the first U-shaped section 20 fully extended. The bottom step member 50 moves from a storage position atop the telescoping leg members 22 (FIG. 7) to a deployed position with the bottom step member 50 extending below and parallel to the top step member 30 (FIG. 6). An enlarged view of the top step member 30, the rigid arm members 42 and the bottom step member 50 in a deployed condition is shown in FIG. 8. A stop member 38 is secured to each opposed end 34 of the top step member 30, adjacent the pivot pin 36, to limit the rotation of the rigid arm members 42 relative to the top step member 30. The stop member 38 may be a bolt, a pin, or any rigid body to limit the rotation of the rigid arm member 42 about the pivot pin 36, and provides about a 30 to 45 degree angle between the horizontal, planar top side 32 of the top step member 30 and the rigid arm member 42. Likewise, a stop member 58 is secured to each opposed end 54 of the bottom step member 50, adjacent the pivot pin 56, to limit the rotation of the rigid arm members 42 relative to the bottom step member 50. The stop member 58 may be a bolt, a pin, or any rigid body to limit the rotation of the rigid arm member 42 about the pivot pin 56, and provides about a 120 to 135 degree angle between the horizontal, planar top side 52 of the bottom step member 50 and the rigid arm member 42.

Although the step assembly 10 is designed for use with the tailgate T of the cargo box in a horizontal or open orientation (FIGS. 2 and 6), the deployed step assembly 10 may be used with the tailgate T in a vertical or closed orientation. In moving the step assembly 10 from the stored position to the deployed position, the first U-shaped section 40 telescopes horizontally from beneath the vehicle frame F a sufficient distance to position the top step member 30 beyond the tailgate T in a horizontal or open condition, as illustrated in FIGS. 2 and 6. The second U-shaped section 40 is sized to clear the cargo box bed B when the bottom step member 50 and attached rigid arms 42 rotate through about 210 degrees, with the first U-shaped section 20 fully extended. The bottom step member 50 moves from a storage position atop the telescoping leg members 22 (FIGS. 1, 4 and 7) to a deployed position with the bottom step member 50 extending below and parallel to the top step member 30 (FIGS. 2, 3, 6 and 8). Once the second U-shaped section 40 is rotated into the deployed position, the telescoping leg members 22 are partially retracted to bring the top step member 30 close to the vertical tailgate T. The partially retracted position for the deployed step assembly 10 provides steps for an individual to stand on to access the cargo box with the tailgate T closed. The above-described sequences of steps is performed in reverse order to return the step assembly 10 to the storage position.

While the invention has been particularly shown and described with reference to preferred embodiments thereof, it will be understood by those skilled in the art that various changes in form and details may be made therein without departing from the spirit and scope of the invention.

We claim:

1. A pull-out step assembly adapted for attachment to a frame of a cargo box vehicle, the step assembly comprising:
   a first U-shaped section including a pair of linear telescoping leg members, each leg member secured at a first end to the vehicle frame and adapted for horizontal extension, a transverse top step member having a horizontal, planar top side and opposed ends, the horizontal top step member rigidly secured to a second end of each telescoping leg member; and
   a second U-shaped section including a pair of linear rigid leg members, each leg member pivotally attached at a first end to one opposed end of the traverse top step member and each leg member pivotally attached at a second end to one opposed end of a transverse bottom step member, with at least one first stop member secured to an opposed end of the top step member to limit pivoting of the first end of each rigid leg member there around, and at least one second stop member secured to an opposed end of the bottom step member to limit pivoting of the second end of each rigid leg member there around, the bottom step member having a horizontal, planar top side and opposed ends;

the second U-shaped section pivotable through at least about 210 degrees from a storage position with the bottom step member resting atop the telescoping leg members to a deployed position with the bottom step member extending below the top step member and the planar top sides of the step members mutually parallel.

2. The pull-out step assembly of claim 1, wherein each linear telescoping leg member comprises a nested slider mechanism including a first slider member immovably secured to the frame of a cargo box vehicle, a second slider member moveably secured to the first slider member, and a third slider member movably secured to the second slider member, one end of the third slider member rigidly attached to the transverse top step member.

3. The pull-out step assembly of claim 1, wherein each rigid leg member forms an angle of about 30 to about 45 degrees with the horizontal, planar top side of the top step member, and each rigid leg member forms an angle of about 120 to about 135 degrees with the horizontal, planar top side of the bottom step member with the step assembly in a deployed position.

4. The pull-out step assembly of claim 1, wherein each linear telescoping leg member is secured at a first end to the vehicle frame by a pair of bracket members.

5. A storage box and pull-out step assembly adapted for attachment to a frame of a cargo box vehicle, the box and step assembly comprising:

a flat, storage box member having a top, a bottom, three vertical sides and one open side, the box member adapted for mounting beneath a cargo box of a vehicle to the frame thereof with the open side toward the rear of the cargo box; and a pull-out step assembly secured interior the storage box member, the step assembly comprising;

a first U-shaped section including a pair of linear telescoping leg members, each leg member fastened at a first end to at least one interior surface of the storage box member and adapted for horizontal extension through the open side of the storage box member, a transverse top step member having a horizontal, planar top side and opposed ends, the horizontal top step member rigidly secured to a second end of each telescoping leg member; and a second U-shaped section including a pair of linear rigid leg members, each leg member pivotally attached at a first end to one opposed end of the transverse top step member and each leg member pivotally attached at a second end to one opposed end of a transverse bottom step member, with at least one first stop member secured to an opposed end of the top step member to limit pivoting of the first end of each rigid leg member there around, and at least one second stop member secured to an opposed end of the bottom step member to limit pivoting of the second end of each rigid lea member there around, the bottom step member having a horizontal, planar top side and opposed ends;

the second U-shaped section pivotable through at least about 210 degrees from a storage position with the bottom step member resting atop the telescoping legs members to a deployed position with the bottom step member extending below the top step member and the planar top sides of the step members mutually parallel, the step assembly fully contained within the storage box member in the storage position, and the top and bottom step members exterior the storage box member in the deployed position.

6. The storage box and pull-out step assembly of claim 5 wherein, each linear telescoping leg member comprises a nested slider mechanism including a first slider member immovably secured to at least one interior surface of the box member, a second slider member moveably secured to the first slider member, and a third slider member movably secured to the second slider member, one end of the third slider member rigidly attached to the transverse top step member.

7. The pull-out step assembly of claim 5, wherein each rigid leg member forms an angle of about 30 to about 45 degrees with the horizontal, planar top side of the top step member, and each rigid leg member forms an angle of about 120 to about 135 degrees with the horizontal, planar top side of the bottom step member with the step assembly in a deployed position.

8. The pull-out step assembly of claim 5, wherein opposed vertical sides of the storage box member are each secured to the vehicle frame by a pair of bracket members.

9. A storage box and pull-out step assembly adapted for attachment to a frame of a cargo box vehicle, the box and step assembly comprising:

a flat, storage box member having a top, a bottom, three vertical sides and one open side, the box member adapted for mounting beneath a cargo box of a vehicle to the frame thereof with the open side toward the rear of the cargo box; and a pull-out step assembly secured interior the storage box member, the step assembly comprising;

a first U-shaped section including a pair of linear telescoping leg members, each leg member fastened at a first end to at least one interior surface of the box member and adapted for horizontal extension through the open side of the storage box member, a transverse top step member having a horizontal, planar top side and opposed ends, the horizontal top step member rigidly secured to a second end of each telescoping leg member, each linear telescoping leg member comprising a nested slider mechanism including a first slider member immovably secured to at least one interior surface of the box member, a second slider member moveably secured to the first slider member, and a third slider member movably secured to the second slider member, one end of the third slider member rigidly attached to the transverse top step member; and a second U-shaped section including a pair of linear rigid leg members, each leg member pivotally attached at a first end to the transverse top step member and each leg member pivotally attached at a second end to a transverse bottom step member, with at least one first stop member secured to an opposed end of the top step member to limit pivoting of the first end of each rigid leg member there around, and at least one second stop member secured to an opposed end of the bottom step member to limit pivoting of second end of each rigid leg member there around, the bottom step member having a horizontal, planar top side and opposed ends;

the second U-shaped section pivotable through at least about 210 degrees from a storage position with the bottom step member resting atop the telescoping legs members to a deployed position with the bottom step member extending below the top step member and the planar top sides of the step members mutually parallel, the step assembly fully contained within the storage box member in the storage position, and the top and bottom step members exterior the storage box member in the deployed position.

10. The pull-out step assembly of claim 9, wherein each rigid leg member forms an angle of about 30 to about 45 degrees with the horizontal, planar top side of the top step member, and each rigid leg member forms an angle of about 120 to about 135 degrees with the horizontal, planar top side of the bottom step member with the step assembly in a deployed position.

11. The pull-out step assembly of claim 9, wherein opposed vertical sides of the storage box member are each secured to the vehicle frame by a pair of bracket members.

* * * * *